(12) United States Patent
TeeKing

(10) Patent No.: US 11,860,614 B2
(45) Date of Patent: Jan. 2, 2024

(54) SYSTEMS AND METHODS FOR RESOLVING WORKFLOW

(71) Applicant: Palantir Technologies Inc., Palo Alto, CA (US)

(72) Inventor: Megan TeeKing, San Francisco, CA (US)

(73) Assignee: Palantir Technologies Inc., Denver, CO (US)

( * ) Notice: Subject to any disclaimer, the term of this patent is extended or adjusted under 35 U.S.C. 154(b) by 809 days.

(21) Appl. No.: 16/675,113

(22) Filed: Nov. 5, 2019

(65) Prior Publication Data

US 2021/0034046 A1 Feb. 4, 2021

Related U.S. Application Data

(60) Provisional application No. 62/882,210, filed on Aug. 2, 2019.

(51) Int. Cl.
*G01C 19/00* (2013.01)
*G01C 25/00* (2006.01)
(Continued)

(52) U.S. Cl.
CPC ........... *G05B 23/0229* (2013.01); *G01D 1/00* (2013.01); *G01D 9/00* (2013.01); *G05B 19/0423* (2013.01);
(Continued)

(58) Field of Classification Search
CPC ........ G06F 11/00; G06F 11/006; G06F 11/07; G06F 11/22; G06F 11/30; G06F 3/041;
(Continued)

(56) References Cited

U.S. PATENT DOCUMENTS

2012/0253746 A1* 10/2012 Kolar ................. G05B 23/0221
702/188
2016/0378089 A1* 12/2016 Lehofer ............... G05B 19/402
700/95
(Continued)

FOREIGN PATENT DOCUMENTS

EP 1965316 A2 9/2008
WO WO-2017/116875 A1 7/2017

OTHER PUBLICATIONS

Extended European Search Report for EP Appln. No. 19213561.4 dated Jan. 24, 2020, 9 pages.
(Continued)

*Primary Examiner* — Michael Ortiz-Sanchez
(74) *Attorney, Agent, or Firm* — Sheppard Mullin Richter & Hampton LLP

(57) ABSTRACT

Systems and methods are provided for updating a workflow by resolving information of the workflow. The systems and methods may be configured to obtain sensor data describing an operation of the workflow, obtain information describing the workflow, determine whether the sensor data is consistent with the information based on predefined criteria, in response to determining that the sensor data is not consistent with the information, determine whether to resolve the sensor data, in response to determining whether to resolve the sensor data, resolve the sensor data to satisfy the predefined criteria or determining that the sensor data is unresolved, and update the workflow based on the resolved sensor data.

20 Claims, 12 Drawing Sheets

(51) Int. Cl.
  *G01D 18/00* (2006.01)
  *G01F 19/00* (2006.01)
  *G05B 23/02* (2006.01)
  *G06F 16/9035* (2019.01)
  *G05B 19/042* (2006.01)
  *G06F 3/041* (2006.01)
  *G01D 1/00* (2006.01)
  *G01D 9/00* (2006.01)
  *G06F 11/00* (2006.01)

(52) U.S. Cl.
  CPC ........ *G06F 3/0418* (2013.01); *G06F 16/9035* (2019.01); *G06F 11/00* (2013.01)

(58) Field of Classification Search
  CPC .... G06F 3/0418; G06F 16/9035; G06F 16/00; G06F 3/0416; G06F 11/004; G06F 11/008; G05B 23/00; G05B 23/0229; G05B 23/0235; G05B 19/04; G05B 19/045; G05B 19/0425; G05B 19/0423; G05B 23/02; G05B 23/0205; G05B 19/00; G05B 19/02; G05B 19/042; G05B 19/0421; G05B 19/0428; G05B 19/048; G05B 23/0227; G01D 18/002; G01D 1/00; G01D 9/00
  See application file for complete search history.

(56) References Cited

U.S. PATENT DOCUMENTS

| | | | |
|---|---|---|---|
| 2018/0356808 A1* | 12/2018 | Alcala Perez | H04L 67/125 |
| 2019/0034475 A1* | 1/2019 | Parikh | G06F 16/2255 |
| 2019/0230106 A1* | 7/2019 | Abbaszadeh | H04L 63/1441 |
| 2020/0387127 A1* | 12/2020 | McGill | G05B 19/0423 |

OTHER PUBLICATIONS

Wombacher, "A-Posteriori Detection of Sensor Infrastructure Errors in Correlated Sensor Data and Business Workflows", International Conference on Financial Cryptography and Data Security, 2011, pp. 329-344.

* cited by examiner

SYSTEMS AND METHODS FOR RESOLVING WORKFLOW

TECHNICAL FIELD

This disclosure relates to approaches for resolving discrepancies in data. In particular, this disclosure relates to processing various datasets to resolve discrepancies in sensor data.

BACKGROUND

Under conventional approaches, machines may process large amounts of data that may be manually entered or generated by the machines. Erroneous entries may occur, for example, due to mistyping, mislabeling or incorrect identification, operator error, or machine error. In some instances, such conventional approaches may not adequately determine and/or correct the erroneous entries. In one example, faulty data in a manufacturing process may not be automatically resolved, and may remain as part of a workflow. Thus, conventional approaches may result in two undesirable outcomes-either the data of the workflow is erroneous, or the manufacturing process would have to be rerun in order to try to correct the data.

SUMMARY

Various embodiments of the present disclosure can include systems, methods, and non-transitory computer readable media configured to obtain sensor data describing an operation of the workflow; obtain information describing the workflow; determine whether the sensor data is consistent with the information based on predefined criteria; in response to determining that the sensor data is not consistent with the information, determine whether to resolve the sensor data; in response to determining whether to resolve the sensor data, resolve the sensor data to satisfy the predefined criteria or determine that the sensor data is unresolved; and update the workflow based on the resolved sensor data.

In some embodiments, the systems, methods, and non-transitory computer readable media are further configured to determine whether the sensor data comprises duplicate entries based on a comparison between hash values of entries of the sensor data; and in response to determining the sensor data comprises one or more duplicate entries, remove the one or more duplicate entries.

In some embodiments, each entry of the sensor data comprises a sensor ID of the operation and a start time of the operation; the information comprises a sensor ID of the workflow, a start time of the workflow and an end time of the workflow; the predefined criteria comprises a first criterion that the start time of each entry of the sensor data is between the start time of the information and the end time of the information, and that the sensor ID of each entry of the sensor data matches the sensor ID of the information; and the determining whether the sensor data is consistent with the information comprises determining, for each entry of the sensor data, whether the predefined criteria is satisfied.

In some embodiments, the resolving the sensor data or determining that the sensor data is unresolved comprises determining that each entry of the sensor data not satisfying the predefined criteria is unresolved.

In some embodiments, each entry of the sensor data further comprises an identification number indicating a sample undergoing the workflow; the information further comprises an identification number indicating a sample undergoing the workflow; and the predefined criteria further comprises a second criterion that the identification number of each entry of the sensor data matches the identification number of the information.

In some embodiments, the identification number of each entry of the sensor data comprises an alphanumeric including a first alphabetic portion preceding a numeric portion and a second alphabetic portion following the numeric portion; the identification number of the information comprises an alphanumeric including a first alphabetic portion preceding a numeric portion and a second alphabetic portion following the numeric portion; and the determining whether the sensor data is consistent with the information comprises determining, for each entry of the sensor data, whether the first alphabetic portion, the numeric portion, and the second alphabetic portion matches the first alphabetic portion, the numeric portion, and the second alphabetic portion of the identification number, respectively.

In some embodiments, each entry of the sensor data further comprises an identification number indicating a sample undergoing the workflow, the identification number of each entry of the sensor data comprising an alphanumeric including a first alphabetic portion preceding a numeric portion and a second alphabetic portion following the numeric portion; the information further comprises an identification number indicating a sample undergoing the workflow, the identification number of the information comprising an alphanumeric including a first alphabetic portion preceding a numeric portion and a second alphabetic portion following the numeric portion; and the determining whether to resolve the sensor data comprises determining, for each entry of the sensor data, whether the first alphabetic portion and the numeric portion matches the first alphabetic portion and the numeric portion of the identification number, respectively.

In some embodiments, each entry of the sensor data further comprises an identification number indicating a sample undergoing the workflow, the identification number of each entry of the sensor data comprising an alphanumeric including a first alphabetic portion preceding a numeric portion and a second alphabetic portion following the numeric portion; the information further comprises an identification number indicating a sample undergoing the workflow, the identification number of the information comprising an alphanumeric including a first alphabetic portion preceding a numeric portion and a second alphabetic portion following the numeric portion; and the determining whether to resolve the sensor data comprises determining, for each entry of the sensor data, whether the numeric portion and the second alphabetic portion matches the numeric portion and the second alphabetic portion of the identification number, respectively.

In some embodiments, each entry of the sensor data further comprises an identification number indicating a sample undergoing the workflow, the identification number of each entry of the sensor data comprising an alphanumeric including a first alphabetic portion preceding a numeric portion and a second alphabetic portion following the numeric portion; the information further comprises an identification number indicating a sample undergoing the workflow, the identification number of the information comprising an alphanumeric including a first alphabetic portion preceding a numeric portion and a second alphabetic portion following the numeric portion; and the determining whether to resolve the sensor data comprises determining, for each entry of the sensor data, whether the numeric portion matches the numeric portion of the identification number.

In some embodiments, the resolving the sensor data to satisfy the predefined criteria comprises, for each entry of the sensor data, in response to determining the numeric portion matches the numeric portion of the identification number, matching the first alphabetic portion and the second alphabetic portion to the first alphabetic portion and the second alphabetic portion of the information, respectively.

These and other features of the systems, methods, and non-transitory computer readable media are disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention(s).

DETAILED DESCRIPTION

A claimed solution rooted in computer technology overcomes problems specifically arising in the realm of computer technology. In various embodiments, a system may resolve a workflow in a cost effective and efficient manner, for example, without requiring additional manufacturing processes to resolve the workflow. In various embodiments, as a manufacturing process or other operation in the workflow is being conducted, the system may record, track, and/or analyze sensor readings or data generated from the workflow. Each of the sensor readings may describe a status of an operation of the workflow at a specific start time and end time. In various embodiments, the system may organize the sensor readings in a table format. Each entry of the table format may comprise an identification number of, or indicating, a sample undergoing the operation, a hash value of the operation, a sensor ID of a sensor or line used in the operation, the start time, and the end time of the operation. The identification number may be manually entered. In some embodiments, the system may determine which sensor readings are accurate and which sensor readings are erroneous by determining whether the sensor readings are consistent with manually logged information describing the workflow. The information may be stored in a log as a sheet or a spreadsheet, and may comprise an identification number of, or indicating, a sample undergoing the workflow, a sensor ID of a sensor or line used in the workflow, a start time, and an end time of the workflow. If the system determines that a sensor reading is erroneous, the system determines whether to resolve the sensor reading based on the logged information, or whether the sensor reading cannot be resolved. If the system determines that the sensor reading can be resolved, the system may correct or resolve the sensor reading to match the logged information. The system may update the workflow based on the resolved sensor data. Many variations are possible.

Figure 1:
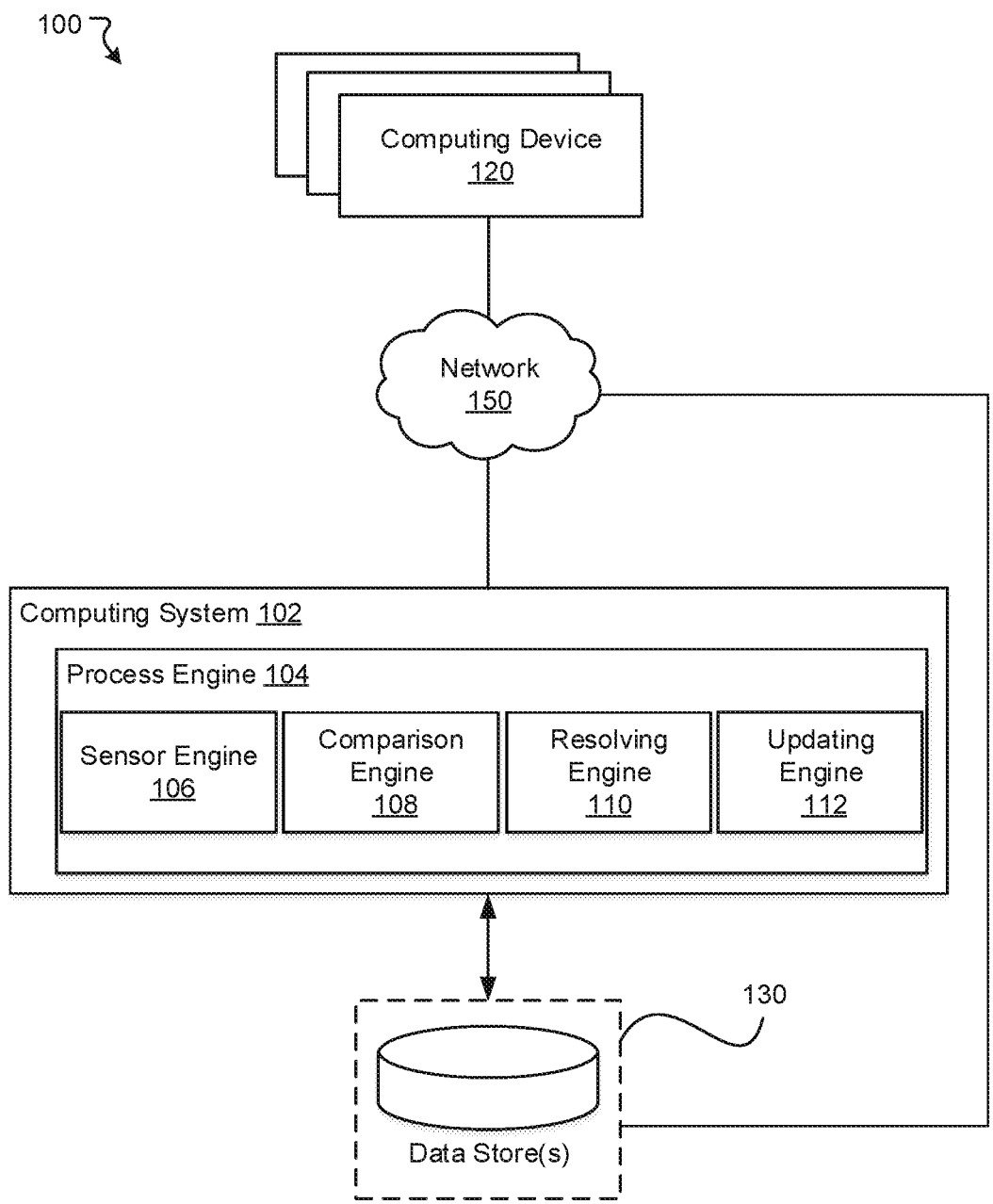
FIG. 1 depicts a diagram of an example of a system, in accordance with various embodiments.

FIG. 1 illustrates an example environment 100, in accordance with various embodiments. The example environment 100 may include at least one computing system 102 that includes one or more processors and memory. The processors may be configured to perform various operations by interpreting machine-readable instructions. In some embodiments, the example environment 100 may be implemented as a data platform. In some embodiments, the example environment 100 may be configured to interact with computing systems of the data platform. In various embodiments, computing systems of the data platform may receive and process search queries to obtain sensor data describing an operation of a workflow and information describing the workflow.

In some embodiments, the computing system 102 may include a process engine 104. The process engine 104 may include a sensor engine 106, a comparison engine 108, a resolving engine 110, and an updating engine 112. The process engine 104 may be executed by the processor(s) of the computing system 102 to perform various operations including those operations described in reference to the sensor engine 106, the comparison engine 108, the resolving engine 110, and the updating engine 112. In general, the process engine 104 may be implemented, in whole or in part, as software that is capable of running on one or more computing devices or systems. In one example, the process engine 104 may be implemented as or within a software application running on one or more computing devices (e.g., user or client devices) and/or one or more servers (e.g., network servers or cloud servers). In some instances, various aspects of the comparison engine 108, the resolving engine 110, and the updating engine 112 may be implemented in one or more computing systems and/or devices. The environment 100 may also include one or more data stores 130 accessible to the computing system 102. The data stores 130 may be accessible to the computing system 102 either directly or over a network 150. In some embodiments, the data stores 130 may store data that may be accessed by the process engine 104 to provide the various features described herein. In some instances, the data stores 130 may include federated data stores, databases, or any other type of data source from which data may be stored and retrieved, for example. In some implementations, data stores 130 may include various types of data sets on which determinations of accuracy or consistency with other information can be made. In general, a user operating a computing device 120 can interact with the computing system 102 over the network 150, for example, through one or more graphical user interfaces and/or application programming interfaces.

The sensor engine 106 may be configured to obtain sensor data describing one or more operations associated with a workflow. For example, a workflow may involve a manufacturing process that involves various equipment (e.g., welding units, injection molding, reactors, etc.). In this example, the sensor engine 106 can obtain sensor data captured by individual sensors that monitor each equipment associated with the workflow. The sensor engine 106 may continuously obtain the sensor data or obtain the sensor data at discrete time intervals. The sensor engine 106 may further process the obtained sensor data to infer additional information, such as when an operation (or sub-operation) begins and ends. The sensor engine 106 may organize the sensor data in a specific format, such as a table format, for example. Each entry in the table may indicate a status of an operation associated with the workflow at a specific time. Further, the sensor data may comprise an identification number of, or indicating, a sample undergoing the operation, a hash value of the operation, a sensor identifier (ID) of a sensor monitoring equipment associated with the operation, a start time of the operation, and an end time of the operation. In some embodiments, each entry of the sensor data may further indicate the operation and/or the sub-operation performed.

The comparison engine 108 may be configured to access the obtained sensor data and determine whether the obtained sensor data is consistent with other information associated with the workflow. For example, the other information may comprise manually logged information stored in a sheet or spreadsheet describing various aspects of the workflow. For example, in some embodiments, the comparison engine 108 can determine whether the obtained sensor data is consistent with information logged in a batch sheet associated with a manufacturing process. The other information may describe the workflow or one or more operations of the workflow. The other information may comprise an identification number of a sample undergoing the workflow, a sensor ID of a sensor or line used in the workflow, a start time, and an end time of the workflow. In order to determine whether the obtained sensor data is consistent with the other information, the comparison engine 108 may compare each entry of the sensor data with the other information based on predefined criteria. In some embodiments, the comparison engine 108 may compare the identification number of each entry of the sensor data with the identification number of the other information. In some embodiments, the comparison engine 108 may compare the sensor ID of each entry of the sensor data with the sensor ID of the other information. In some embodiments, the comparison engine 108 may compare the start time of each entry of the sensor data with the start time and/or the end time of the other information. For each entry in which the sensor data is determined to match the other information, or be within boundaries of the other information, based on the predefined criteria, the comparison engine 108 may determine that the entry is accurate and/or resolved. Otherwise, for each entry in which the sensor data is determined not to be consistent with the other information, based on predefined criteria, the comparison engine 108 may determine that the entry is unresolved. As an example, the comparison engine 108 may determine a probability that the sensor data is consistent with the other information. If the probability exceeds a first threshold, the comparison engine 108 may determine that the sensor data is consistent with the other information. Otherwise, if the probability does not exceed the first threshold, the comparison engine 108 may determine that the sensor data is consistent with the other information. For example, the first threshold may be between 90% and 95%. Alternatively, the first threshold may be set based on a cost of erroneously resolving inaccurate sensor data and/or a cost of erroneously failing to resolve accurate sensor data.

The comparison engine 108 may provide results of resolved and unresolved entries to the resolving engine 110. The resolving engine 110 may determine whether any entries are duplicate entries by comparing hash values of all entries. For example, if two entries have a common hash value, the resolving engine 110 may determine that one of the two entries is a duplicate. The resolving engine 110 may eliminate duplicate or repeating entries. In various embodiments, for all unresolved entries, the resolving engine 110 may determine whether the entries are resolvable by applying one or more rules over one or more sequences. Each of the one or more sequences may comprise resolving, by the resolving engine 110, any previously unresolved entries that satisfy a predetermined rule while leaving other entries that do not satisfy the predetermined rule to be unresolved. The resolving engine 110 may provide an output of resolved and unresolved entries of each of the one or more sequences. As an example, the resolving engine 110 may provide the output through an interface provided by a software application, such as an application or web browser, running on a computing device 120 and through a display screen of the computing device 120. The interface may provide users with the ability to view the output, select one or more resolved entries or unresolved entries, view further details of the one or more resolved entries or unresolved entries, filter the one or more resolved entries or unresolved entries, view one or more graphical representations, and view statistical information, to name some examples. More details describing the resolving engine 110 will be provided below in reference to FIG. 2. More details describing the graphical representations are provided below in reference to FIGS. 3A-3G.

The updating engine 112 may be configured to update a workflow based on the resolved data from the resolving engine 110. For example, the updating engine 112 may be configured to separate resolved entries from unresolved entries. As another example, the updating engine 112 may be configured to annotate, label, or identify resolved entries and unresolved entries. As another example, the updating engine 112 may be configured to redact any unresolved entries. Many variations are possible.

Figure 2:
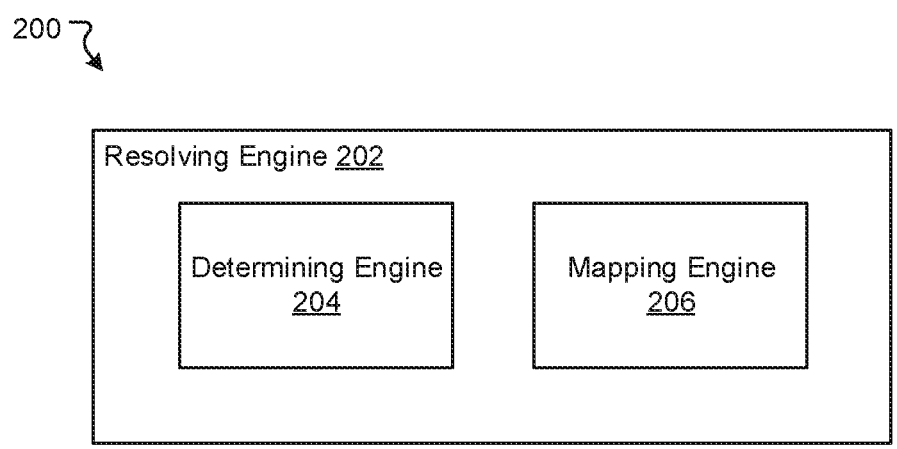
FIG. 2 depicts a diagram of a resolving engine, in accordance with various embodiments.

FIG. 2 illustrates an example 200 of a resolving engine 202, in accordance with various embodiments. In some embodiments, the resolving engine 202 may be implemented as resolving engine 110 in FIG. 1. The resolving engine 202 may include a determining engine 204 and a mapping engine 206. The determining engine 204 may determine whether any of the entries of the sensor data are duplicate entries. The determining engine 204 may further determine whether any remaining unresolved entries are resolvable by applying a succession of rules. In each succession of rules, the determining engine 204 may determine that any previously unresolved entries that satisfy a predetermined rule are resolvable, while leaving other entries that do not satisfy the predetermined rule to be unresolved.

Figure 3A:
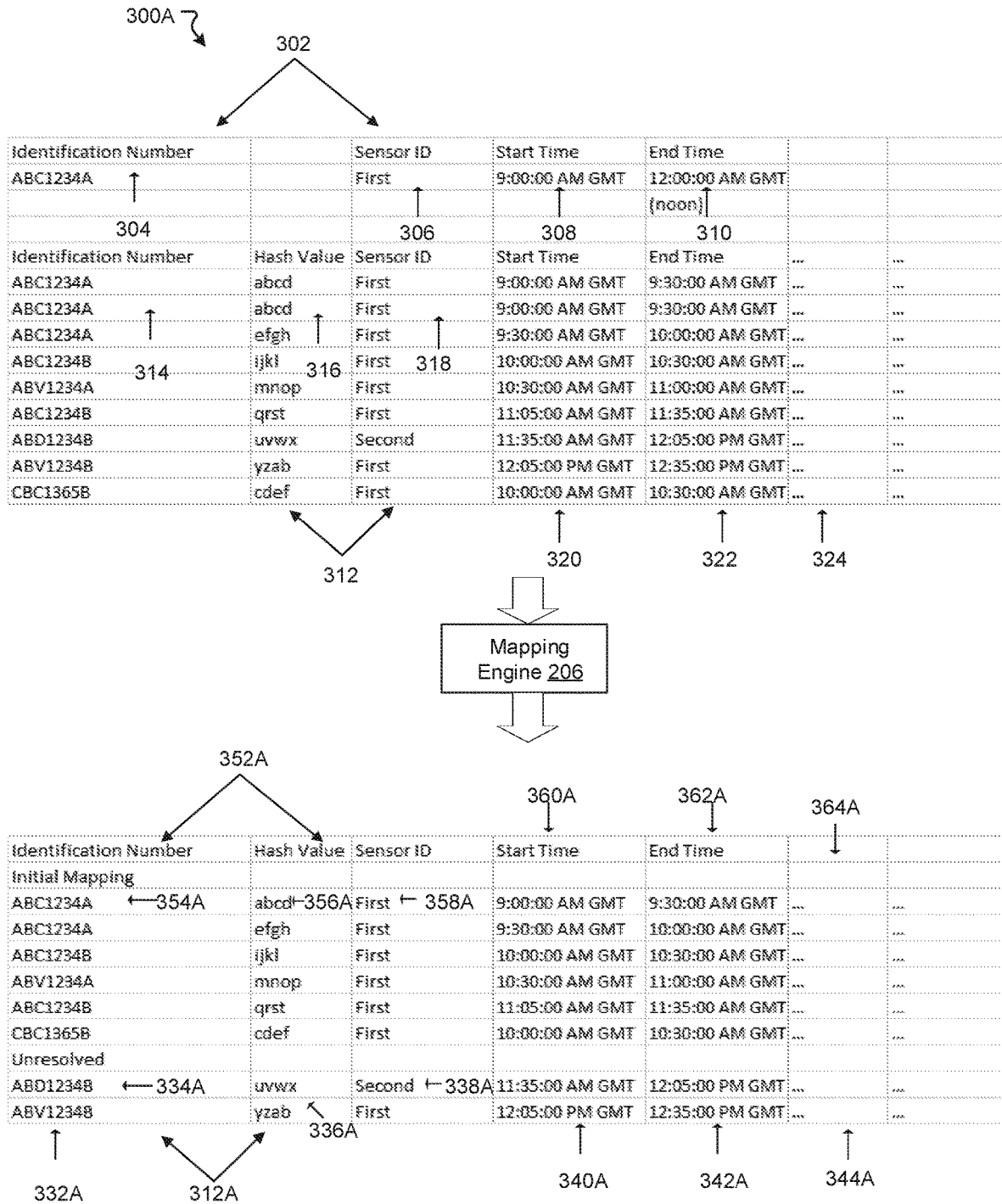
FIGS. 3A-3G illustrate example interfaces showing outputs in a resolving engine, in accordance with various embodiments.
Figure 3B:
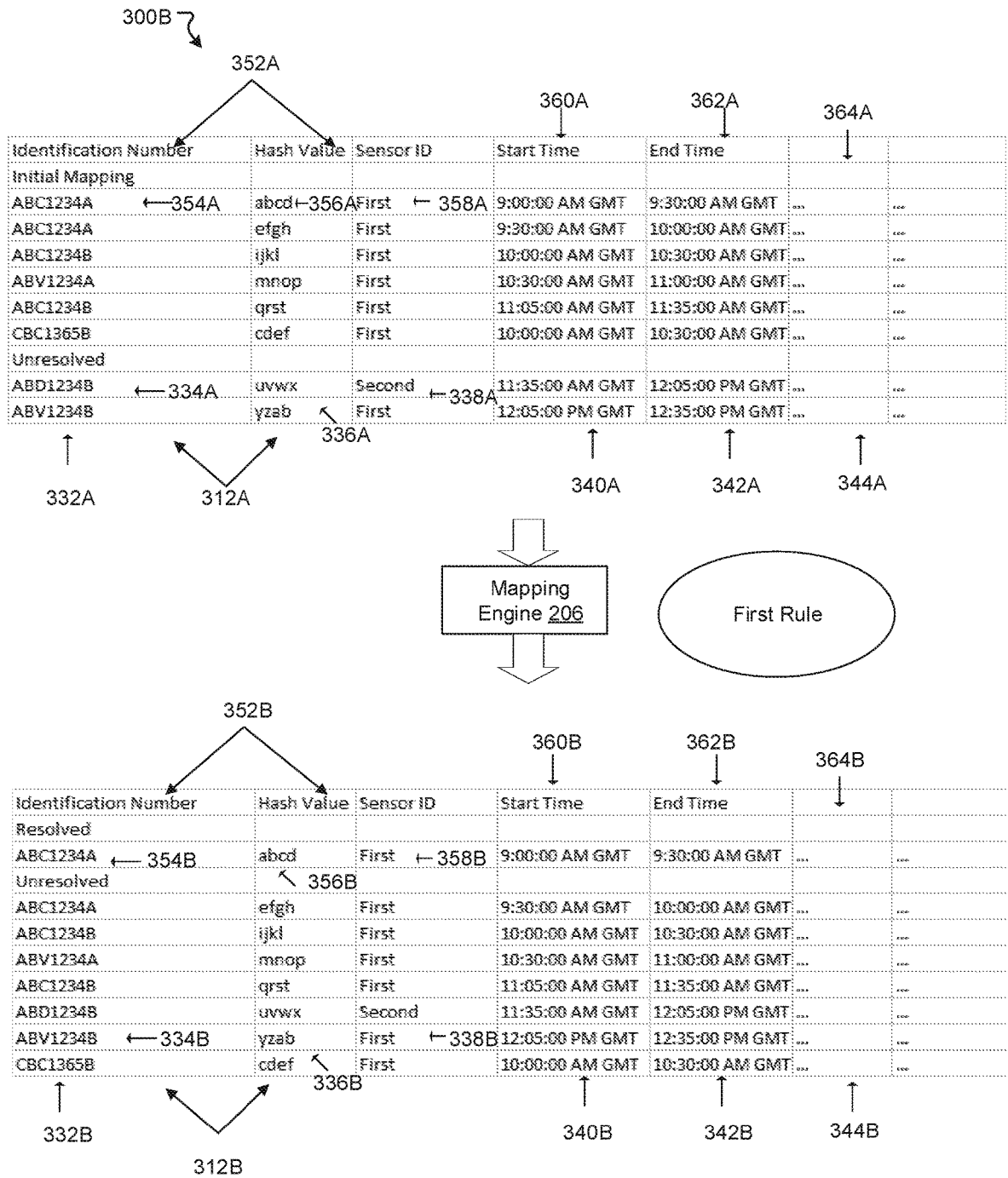

The mapping engine 206 may resolve any previously unresolved entries determined to be resolvable, and output updated results of resolved entries. Initially, as shown in the example 300A of FIG. 3A, the mapping engine may be configured to output a representation of information 302 and sensor data 312. As an example, the information 302 may correspond to a manually logged entry that describes a workflow (e.g., a manufacturing process), such as information logged in a spreadsheet (e.g., a batch sheet) while the sensor data 312 may correspond to sensor data obtained from one or more sensors (e.g., Pi sensors) that monitor equipment (e.g., welding units, injection molding, reactors, etc.) associated with the workflow. In some embodiments, the information 302 may comprise an identification number 304 of a sample undergoing the workflow, a sensor ID 306 of a sensor or line used in the workflow, a start time 308, and an end time 310 of the workflow. The identification number 304 may comprise an alphanumeric including a first alphabetic portion preceding a numeric portion and a second alphabetic portion following the numeric portion. As an example, the identification number 304 in FIG. 3A comprises a first alphabetic portion "ABC," which precedes a numeric portion "1234," and a second alphabetic portion "A" following the numeric portion. In some embodiments, the sensor data 312 may comprise entries, each of the entries comprising an identification number 314 of a sample undergoing an operation of the workflow, a hash value 316, a sensor ID 318 of a sensor or line used, a start time 320, an end time 322, and other sensor data 324 of the operation of the workflow. The identification number 314 may comprise an alphanumeric including a first alphabetic portion preceding a numeric portion and a second alphabetic portion following the numeric portion. As an example, the identification number 314 in FIG. 3A comprises a first alphabetic portion "ABC," which precedes a numeric portion "1234," and a second alphabetic portion "A" following the numeric portion. As an example, the other sensor data 324 may comprise the operation, a suboperation, a process, and/or a subprocess of the workflow, such as assembly or welding. In FIG. 3A, the information 302 and the sensor data 312 may be provided as input to the mapping engine 206. The mapping engine 206 may eliminate any duplicate entries from the sensor data 312. As shown in FIG. 3A, two entries with hash value "abcd" are present in the sensor data 312. The mapping engine 206 may remove one of the entries with same hash values. If more than two entries have common hash values, the mapping engine 206 may remove all entries except for one having the common hash values. The mapping engine 206 may additionally perform an initial mapping to map all entries of the sensor data 312 satisfying predetermined criteria of having sensor IDs 318 that match the sensor ID 306 of the information 302, while also having start times 320 that are within the ranges of the start time 308 and the end time 310 of the information 302. Each of the initially mapped entries 352A may comprise an identification number 354A of a sample undergoing an operation of the workflow, a hash value 356A, a sensor ID 358A of a sensor used, a start time 360A, an end time 362A, and other sensor data 364A of an operation of the workflow. As a result of the initial mapping, sensor data 312A may comprise initially mapped entries 352A. In FIG. 3A, the initially mapped entries 352A all have sensor IDs 358A of "first," and start times 360A within the range of 9:00:00 AM GMT to 12:00:00 PM GMT, to match the sensor ID 306, the start time 308 and the end time 310 of the information 302. Entries of the sensor data 312A that are not mapped may be identified as unresolved entries 332A. In FIG. 3A, entries having a sensor ID other than "first," or a start time not within the range of 9:00:00 AM GMT to 12:00:00 PM GMT, do not satisfy the predetermined criteria and may be identified as unresolved. The unresolved entries 332A may each comprise an identification number 334A of a sample undergoing an operation of the workflow, a hash value 336A, a sensor ID 338a, a start time 340A, an end time 342A, and other sensor data 344A of the operation of the workflow. In some examples, the mapping engine 206 may validate the initially mapped entries 352A by determining whether any start times 360A or end times 362A of the initially mapped entries 352A overlap. For example, such a scenario may exist if a start time 340A and end time 342A of one entry were 9:00:00 AM GMT and 9:30:00 AM GMT, respectively, and another start time 340A and end time 342A of another entry were 9:20:00 AM GMT and 9:50 AM GMT, respectively. If an overlap of only one second exists, for example, at 9:30:00 AM GMT, the mapping engine 206 may nonetheless validate the initially mapped entries 352A. If the mapping engine 206 determines an overlap, the mapping engine 206 may select an earliest entry, based on the start times 360A and/or the end times 362A, satisfying one of the following: the identification number 354A matches the identification number 304 of the information 302; the first alphabetic portion and the numeric portion of the identification number 354A matches the first alphabetic portion and the numeric portion of the identification number 304; the numeric portion and the second alphabetic portion of the identification number 354A matches the numeric portion and the second alphabetic portion of the identification number 304; or the numeric portion of the identification number 354A matches the numeric portion of the identification number 304.

In some embodiments, the mapping engine 206 may be configured to apply one or more rules to resolve one or more of the initially mapped entries 352A of the sensor data 312A. As shown in the example 300B of FIG. 3B, the mapping engine 206 may apply a first rule and select one entry from the initially mapped entries 352A. The first rule may comprise selecting an earliest of an entry, based on the start times 360A and/or the end times 362A, from the initially mapped entries 352A satisfying one of the following: the identification number 354A matches the identification number 304 of the information 302; the first alphabetic portion and the numeric portion of the identification number 354A matches the first alphabetic portion and the numeric portion of the identification number 304; the numeric portion and the second alphabetic portion of the identification number 354A matches the numeric portion and the second alphabetic portion of the identification number 304; or the numeric portion of the identification number 354A matches the numeric portion of the identification number 304. As shown in the example of FIG. 3A, the identification number 302 of the information 304 is "ABC1234A." Thus, of the initially mapped entries 352A, the mapping engine 206 may select an earliest entry from entries having identification numbers 354A of "ABC1234A," "ABC1234B," "ABV1234A," and "ABC1234B", which satisfy the first rule. The mapping engine 206 may select the entry having a hash value 356A of "abcd," and a start time 360A of 9:00:00 AM GMT. The mapping engine 206 may output an updated mapping of the sensor data 312B comprising the selected entry as a resolved entry 352B, and remaining entries not selected to be mapped as unresolved entries 332B. The resolved entry 352B may comprise an identification number 354B of a sample undergoing an operation of the workflow, a hash value 356B, a sensor ID 358B of a sensor used, a start time 360B, an end time 362B, and other sensor data 364B of an operation of the workflow. The mapping engine 206 may confirm that every entry having the same identification number 354B of the selected entry, in this case, "ABC1234A," has a same sensor ID 358B of "first." As a result, for example, the mapping engine 206 may confirm that a specific sample goes through no more than one sensor at any point in time. Additionally, the mapping engine 206 may confirm that a sensor ID 358B of the selected entry maps to a single identification number 354B, in this case "ABC1234A," during a time period between a start time 360B of 9:00 AM GMT and an end time 362B of 9:30 AM GMT. In some embodiments, the mapping engine 206 may confirm that a sensor ID 358B is unique to an identification number 354B during a specified time range, such as between 9:00 AM GMT and 9:30 AM GMT. As a result, for example, the mapping engine 206 may confirm that a specific sensor does not have multiple samples going through that sensor at one time, or during a single time period. In response to the mapping engine 206 not successfully performing the confirmations described above, the mapping engine 206 may not include the selected entry as a resolved entry 352B, but rather, keep the selected entry as an unresolved entry 332B. The one or more unresolved entries 332B may each comprise an identification number 334B of a sample undergoing an operation of the workflow, a hash value 336B, a sensor ID 338B of a sensor used, a start time 340B, an end time 342B, and other sensor data 344B of an operation of the workflow.

Figure 3C:
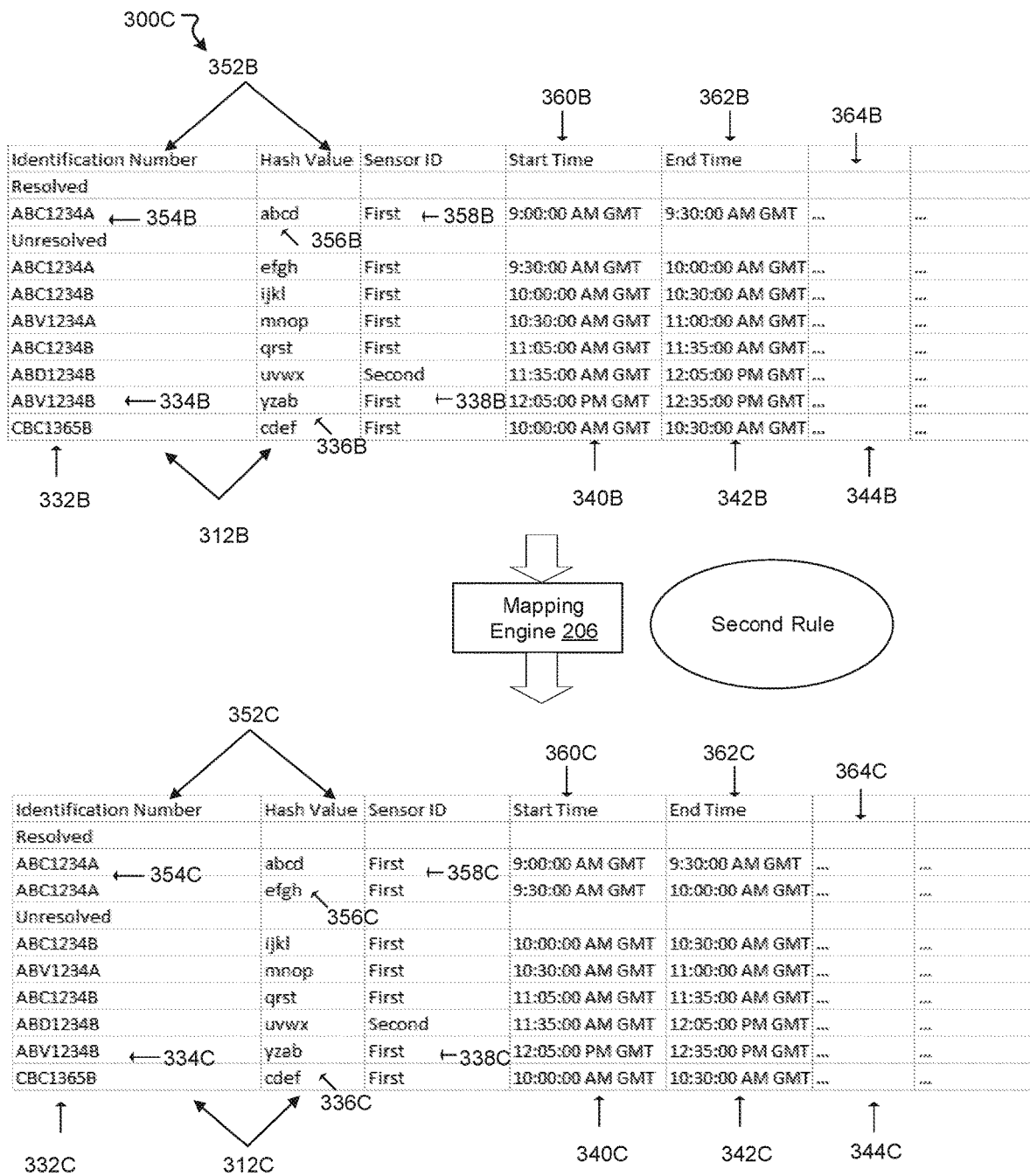

In some embodiments, the mapping engine 206 may successively apply additional rules to resolve remaining unresolved entries 332B. As shown in example 300C of FIG. 3C, the mapping engine 206 may apply a second rule to resolve remaining unresolved entries 332B satisfying the following: the identification number 334B matches the identification number 304 of the information 302; the start time 340B is within a range of the start time 308 and the end time 310 of the information 302; and the sensor ID 338B matches the sensor ID 306 of the information 302. As shown in the example of FIG. 3A, the identification number 302 of the information 304 is "ABC1234A." Thus, of the remaining unresolved entries 332B, the mapping engine 206 may select the entry ("ABC1234A") having a hash value 336B of "efgh," and a start time 340B of 9:30:00 AM GMT, since this entry satisfies the second rule. The mapping engine 206 may create an updated mapping of the sensor data 312C by appending the selected entry to the previously resolved entries 352B and output updated resolved entries 352C, and remaining entries not selected to be mapped as unresolved entries 332C. The resolved entries 352C may each comprise identification numbers 354C of samples undergoing an operation of the workflow, hash values 356C, sensor IDs 358C of sensors used, start times 360C, end times 362C, and other sensor data 364C of an operation of the workflow. The one or more unresolved entries 332C may each comprise identification numbers 334C of samples undergoing an operation of the workflow, hash values 336C, sensor IDs 338C of sensors used, start times 340C, end times 342C, and other sensor data 344C of an operation of the workflow. The mapping engine 206 may perform a further validation on the resolved entries 352C to ensure that at any point in time, each identification number 354C corresponds or maps to only a single sensor ID 358C, and at a given point in time, each sensor ID 358C only corresponds or maps to a single identification number 354C. For example, at 9:20:00 AM GMT, or at a time period between 9:00 AM GMT and 9:30 AM GMT, the entry having a hash value 356C of "efgh" is the only entry that corresponds to sensor ID "first," and the entry having a sensor ID 358C of "first" is the only entry that corresponds to an identification number 354C. In the example of FIG. 3C, only a single sensor ID 358C, and only a single identification number 354C, is listed. In some embodiments, each sensor ID 358C may be mapped to different identification numbers 354C in different, non-overlapping time periods such as time periods of 30 minutes long. As an example, a sensor ID 358C may be mapped to an identification number 354C in a time period between 9:00 AM GMT and 9:30 AM GMT, and mapped to a different identification number in another time period. In other words, a sensor may have different samples passing through it during different time periods. In some embodiments, the mapping engine 206 may confirm that a sensor ID 358C is unique to an identification number 354C during a specified time range. Additionally, the mapping engine 206 may confirm that no overlap of time periods between different resolved entries occurs. In some examples, the mapping engine 206 may confirm that a start time 360C of an entry 352C is not before an end time 362C of an immediate or most recent previous entry. If an overlap of only one second exists, for example, at 9:30:00 AM GMT, which may correspond to an end time 362C of one entry and a start time 360C of a next entry, the mapping engine 206 may nonetheless validate the resolved entries 352C. In the example 300C of FIG. 3C, the mapping engine validates the resolved entries 352C.

Figure 3D:
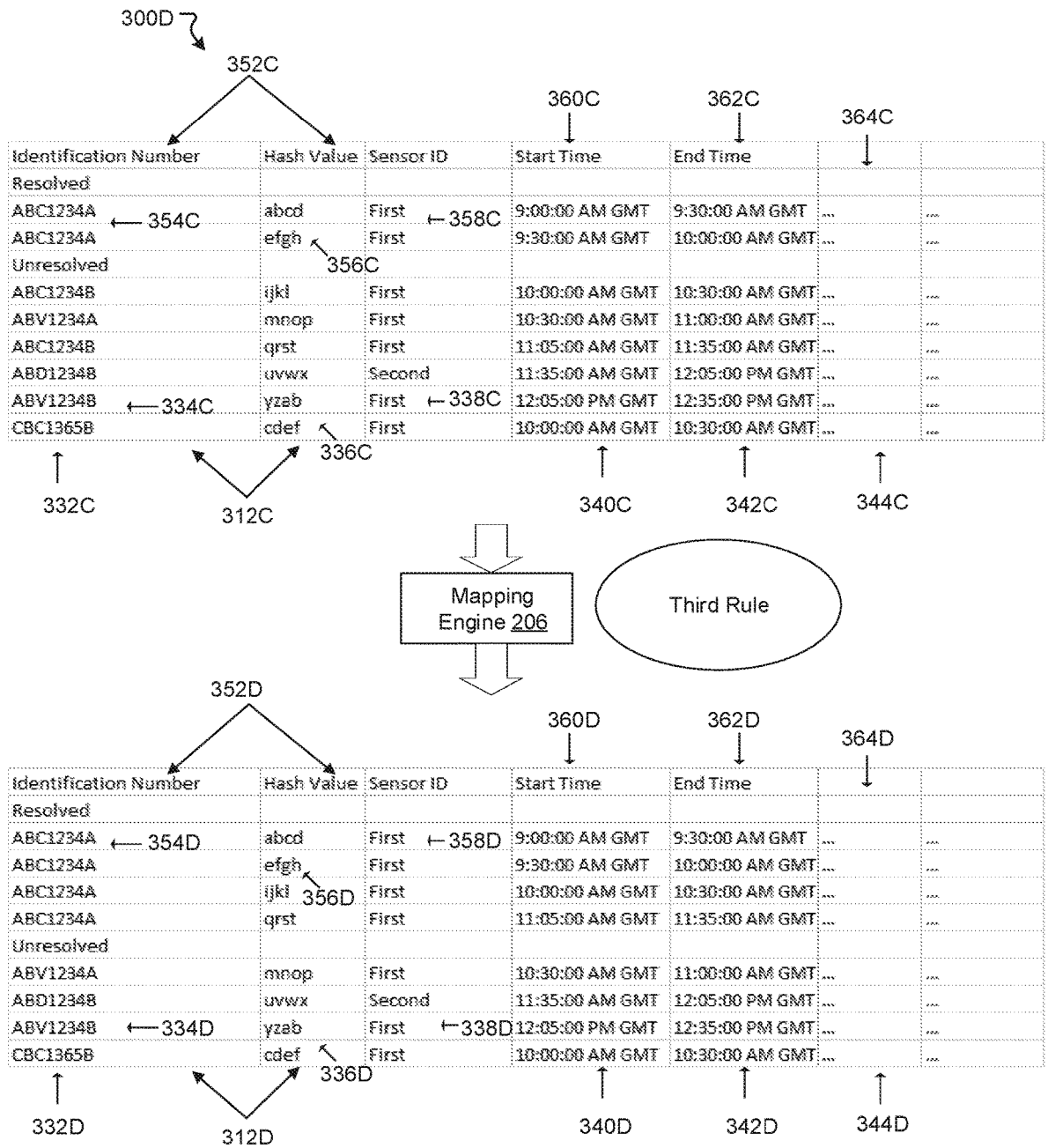

As shown in example 300D of FIG. 3D, the mapping engine 206 may apply a third rule to resolve remaining unresolved entries 332C satisfying the following: the first alphabetic portion and the numeric portion of the identification number 334C matches the first alphabetic portion and the numeric portion of the identification number 304 of the information 302; the start time 340C is within a range of the start time 308 and the end time 310 of the information 302; and the sensor ID 338C matches the sensor ID 306 of the information 302. In other words, the second alphabetic portion of the identification number 334C does not need to match the second alphabetic portion of the information 302. Thus, of the remaining unresolved entries 332C, the mapping engine 206 may select the entries ("ABC1234B" and "ABC1234B") having hash values 336C of "ijkl" and "qrst" with respective start times 340C of 10:00:00 AM GMT and 11:05:00 AM GMT. The mapping engine 206 may create an updated mapping of the sensor data 312D by appending the selected entries to the previously resolved entries 352C. The mapping engine 206 may output the appended selected entries with the previously resolved entries as updated resolved entries 352D, and remaining entries not selected to be mapped as unresolved entries 332D. The resolved entries 352D may each comprise identification numbers 354D of samples undergoing an operation of the workflow, hash values 356D, sensor IDs 358D of sensors used, start times 360D, end times 362D, and other sensor data 364D of an operation of the workflow. The identification numbers 354D may be updated or corrected to match the identification number 304 of the information 302. In the example of FIG. 3D, the previous identification numbers 334C reading "ABC1234B" may be corrected to the identification numbers 354D reading "ABC1234A," when the mapping engine 206 outputs the resolved entries 352D. The one or more unresolved entries 332D may each comprise identification numbers 334D of samples undergoing an operation of the workflow, hash values 336D, sensor IDs 338D of sensors used, start times 340D, end times 342D, and other sensor data 344D of an operation of the workflow. The mapping engine 206 may perform a further validation on the resolved entries 352D to ensure that at any point in time, each identification number 354D corresponds or maps to only a single sensor ID 358D, and at a given point in time, or during a given time window, each sensor ID 358D only corresponds or maps to a single identification number 354D. For example, at 10:20:00 AM GMT, the entry ("ABC1234B") having a hash value 356D of "ijkl" is the only entry that corresponds to sensor ID "first," and the entry having a sensor ID 358D of "first" is the only entry that corresponds to an identification number 354D. In the example of FIG. 3D, only a single sensor ID 358D, and only a single identification number 354D, is listed, at a time period between the start time 360D of 10:00 AM GMT and the end time 362D of 10:30 AM GMT. In some embodiments, each sensor ID 358D may be mapped to different identification numbers 354D in different, non-overlapping time periods such as time periods of 30 minutes long. As an example, a sensor ID 358D may be mapped to an identification number 354D in a time period between 10:00 AM GMT and 10:30 AM GMT, and mapped to a different identification number in another time period. In some embodiments, multiple distinct sensor IDs 358D and multiple distinct identification numbers 354D may exist at a given point in time. The mapping engine 206 may confirm that, at a given point in time or within a given time window, a sensor ID 358D is mapped in a one-to-one relationship with an identification number 354D. For example, the mapping engine 206 may confirm that, within a given time window, a sensor ID 358D is uniquely matched to a single identification number 354D, and an identification number 354D is uniquely matched to a single sensor ID 358D. In some embodiments, the mapping engine 206 may confirm that a sensor ID 358D is unique to an identification number 354D during a specified time range. Additionally, the mapping engine 206 may confirm that no overlap of time periods between different resolved entries occurs. In some examples, the mapping engine 206 may confirm that a start time 360D of an entry 352D is not before an end time 362D of a most recent previous entry. If an overlap of only one second exists, for example, at 10:30:00 AM GMT, the mapping engine 206 may nonetheless validate the resolved entries 352D. In the example 300D of FIG. 3D, the mapping engine validates the resolved entries 352D.

Figure 3E:
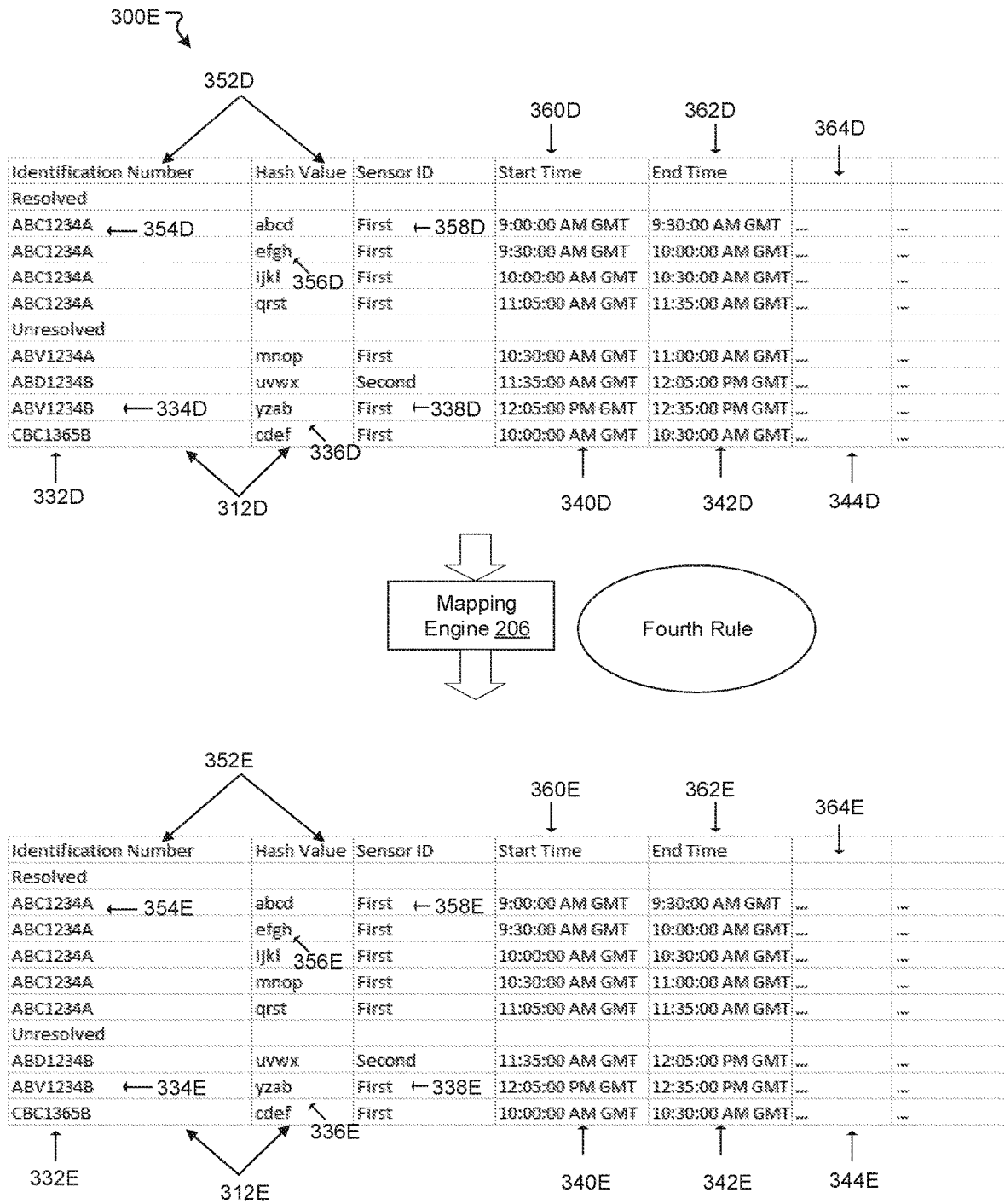

As shown in example 300E of FIG. 3E, the mapping engine 206 may apply a fourth rule to resolve remaining unresolved entries 332D satisfying the following: the numeric portion and the second alphabetic portion of the identification number 334D matches the first alphabetic portion and the numeric portion of the identification number 304 of the information 302; the start time 340D is within a range of the start time 308 and the end time 310 of the information 302; and the sensor ID 338D matches the sensor ID 306 of the information 302. In other words, the first alphabetic portion of the identification number 334D does not need to match the first alphabetic portion of the information 302. Thus, of the remaining unresolved entries 332D, the mapping engine 206 may select the entry ("ABV1234A") having the hash value 336D of "mnop" with the start time 340E of 10:30:00 AM GMT. The mapping engine 206 may create an updated mapping of the sensor data 312E by appending the selected entry to the previously resolved entries 352D. The mapping engine 206 may output the appended selected entries with the previously resolved entries as updated resolved entries 352E, and remaining entries not selected to be mapped as unresolved entries 332E. The resolved entries 352E may each comprise identification numbers 354E of samples undergoing an operation of the workflow, hash values 356E, sensor IDs 358E of sensors used, start times 360E, end times 362E, and other sensor data 364E of an operation of the workflow. The one or more identification numbers 354E may be updated or corrected to match the identification number 304 of the information 302. In the example of FIG. 3E, the previous identification number 334D reading "ABC1234B" may be corrected to the identification number 354E reading "ABC1234A," when the mapping engine 206 outputs the resolved entries 352E. The one or more unresolved entries 332E may each comprise identification numbers 334E of samples undergoing an operation of the workflow, hash values 336E, sensor IDs 338E of sensors used, start times 340E, end times 342E, and other sensor data 344E of an operation of the workflow. The mapping engine 206 may perform a further validation on the resolved entries 352E to ensure that at any point in time, each identification number 354E corresponds or maps to only a single sensor ID 358E, and each sensor ID 358E only corresponds or maps to a single identification number 354E during a specified time period between a start time 360E and an end time 362E, such as between 10:30 AM GMT and 11:00 AM GMT. In the example of FIG. 3E, at 10:40:00 AM GMT, or between 10:30 AM GMT and 11:00 AM GMT, the entry having a hash value 356E of "mnop" is the only entry that corresponds to sensor ID "first," and the entry having a sensor ID 358E "first" is the only entry that corresponds to an identification number 354E. In the example of FIG. 3E, only a single sensor ID 358E, and only a single identification number 354E, is listed, at a time period between the start time 360E of 10:30 AM GMT and the end time 362E of 11:00 AM GMT. In some embodiments, each sensor ID 358E may be mapped to different identification numbers 354E in different, non-overlapping time periods such as time periods of 30 minutes long. As an example, a sensor ID 358E may be mapped to an identification number 354E in a time period between 10:30 AM GMT and 11:00 AM GMT, and mapped to a different identification number in another time period. In some embodiments, multiple distinct sensor IDs 358E and multiple distinct identification numbers 354E may exist at a given point in time. The mapping engine 206 may confirm that, at a given point in time or within a given time window, a sensor ID 358E is mapped in a one-to-one relationship with an identification number 354E. For example, the mapping engine 206 may confirm that, within a given time window, a sensor ID 358E is uniquely matched to a single identification number 354E, and an identification number 354E is uniquely matched to a single sensor ID 358E. In some embodiments, the mapping engine 206 may confirm that a sensor ID 358E is unique to an identification number 354E during a specified time range. Additionally, the mapping engine 206 may confirm that no overlap of time periods between different resolved entries occurs. In some examples, the mapping engine 206 may confirm that a start time 360E of an entry 352E is not before an end time 362E of a most recent previous entry. If an overlap of only one second exists, for example, at 10:30:00 AM GMT, the mapping engine 206 may nonetheless validate the resolved entries 352E. In the example 300E of FIG. 3E, the mapping engine validates the resolved entries 352E.

Figure 3F:
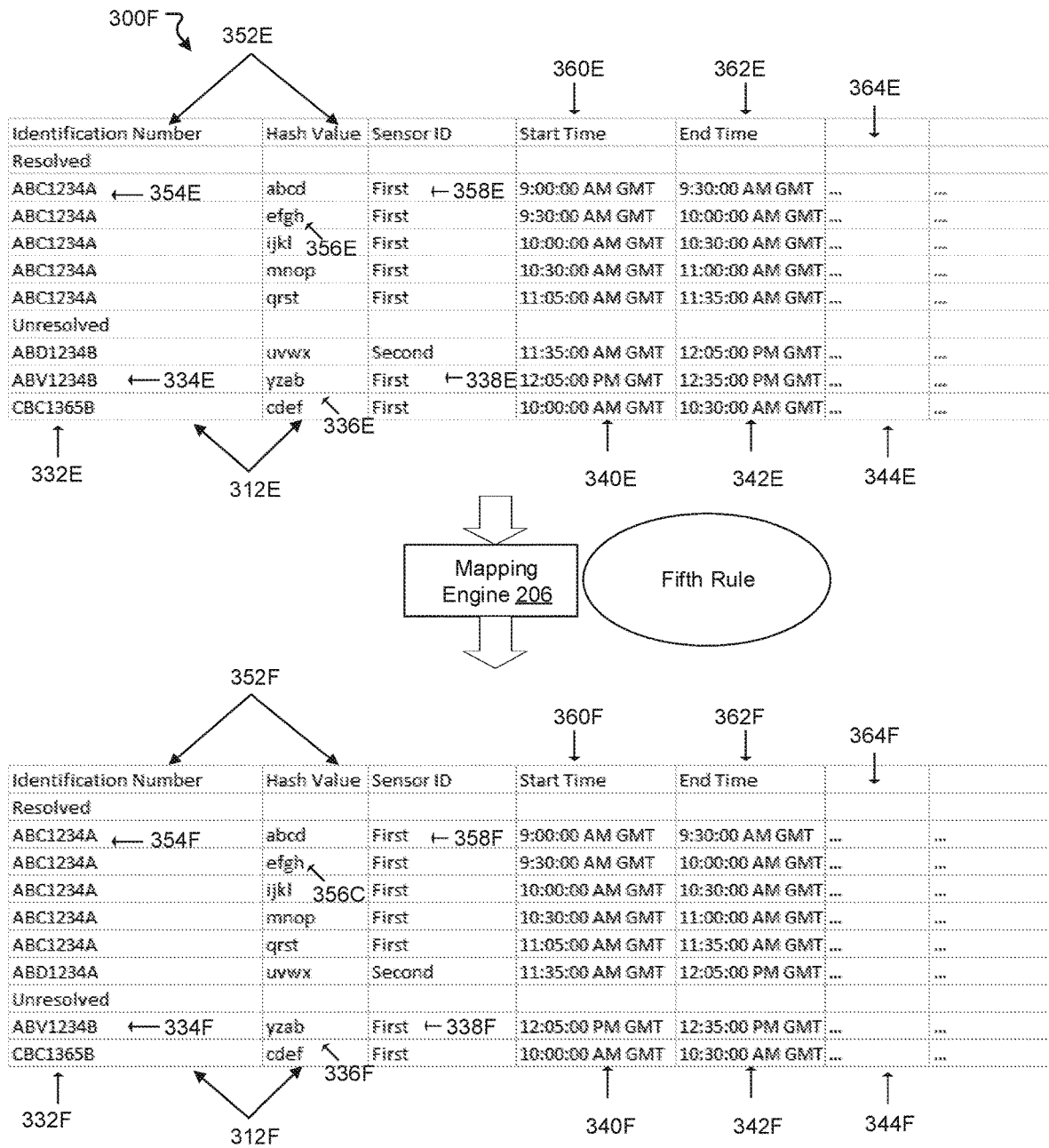

As shown in example 300F of FIG. 3F, the mapping engine 206 may apply a fifth rule to resolve remaining unresolved entries 332E satisfying the following: the numeric portion of the identification number 334E matches the numeric portion of the identification number 304 of the information 302; and the start time 340E is within a range of the start time 308 and the end time 310 of the information 302. In other words, the first alphabetic portion and the second alphabetic portion of the identification number 334E do not need to match the first alphabetic portion and the second alphabetic portion of the information 302. Furthermore, in some examples, the sensor ID 338E may not need to match the sensor ID 306 of the information 302. Thus, of the remaining unresolved entries 332E, the mapping engine 206 may select the entry ("ABD1234B") having the hash value 336E of "uvwx" with the start time 340E of 11:35:00 AM GMT. The mapping engine 206 may create an updated mapping of the sensor data 312F by appending the selected entry to the previously resolved entries 352E. The mapping engine 206 may output the appended selected entries with the previously resolved entries as updated resolved entries 352F, and remaining entries not selected to be mapped as unresolved entries 332F. The resolved entries 352F may each comprise identification numbers 354F of samples undergoing an operation of the workflow, hash values 356F, sensor IDs 358F of sensors used, start times 360F, end times 362F, and other sensor data 364F of an operation of the workflow. The one or more identification numbers 354F may be updated or corrected to match the identification number 304 of the information 302. In the example of FIG. 3F, the previous identification number 334E reading "ABD1234B" may be corrected to the identification number 354F reading "ABC1234A," when the mapping engine 206 outputs the resolved entries 352F. The one or more unresolved entries 332F may each comprise identification numbers 334F of samples undergoing an operation of the workflow, hash values 336F, sensor IDs 338F of sensors used, start times 340F, end times 342F, and other sensor data 344F of an operation of the workflow. The mapping engine 206 may perform a further validation on the resolved entries 352F to ensure that at any given point in time, each identification number 354F corresponds or maps to only a single sensor ID 358F, and each sensor ID 358F only corresponds or maps to a single identification number 354F during a specified time period between a start time 360F and an end time 362F, such as between 11:35 AM GMT and 12:05 PM GMT. For example, at 11:40:00 AM GMT, or between 11:35 AM GMT and 12:05 PM GMT, the entry ("ABD1234A") having a hash value 356F of "uvwx" is the only entry that corresponds to sensor ID "second," and the entry having a sensor ID 358F of "second" is the only entry that corresponds to an identification number 354F. In the example of FIG. 3F, only a single sensor ID 358F, and only a single identification number 354F, is listed, at a time period between the start time 360F of 11:35 AM GMT and the end time 362F of 12:05 PM GMT. In some embodiments, each sensor ID 358F may be mapped to different identification numbers 354F in different, non-overlapping time periods such as time periods of 30 minutes long. As an example, a sensor ID 358F may be mapped to an identification number 354F in a time period between 11:35 AM GMT and 12:05 PM GMT, and mapped to a different identification number in another time period. In some embodiments, multiple distinct sensor IDs 358F and multiple distinct identification numbers 354F may exist at a given point in time. The mapping engine 206 may confirm that, at a given point in time or within a given time window, a sensor ID 358F is mapped in a one-to-one relationship with an identification number 354F. For example, the mapping engine 206 may confirm that, within a given time window, a sensor ID 358F is uniquely matched to a single identification number 354F, and an identification number 354F is uniquely matched to a single sensor ID 358F. In some embodiments, the mapping engine 206 may confirm that a sensor ID 358F is unique to an identification number 354F during a specified time range. Additionally, the mapping engine 206 may confirm that no overlap of time periods between different resolved entries occurs. In some examples, the mapping engine 206 may confirm that a start time 360F of an entry 352F is not before an end time 362F of a most recent previous entry. If an overlap of only one second exists, for example, at 11:35:00 AM GMT, the mapping engine 206 may nonetheless validate the resolved entries 352F. In the example 300E of FIG. 3F, the mapping engine 206 validates the resolved entries 352F.

Figure 3G:
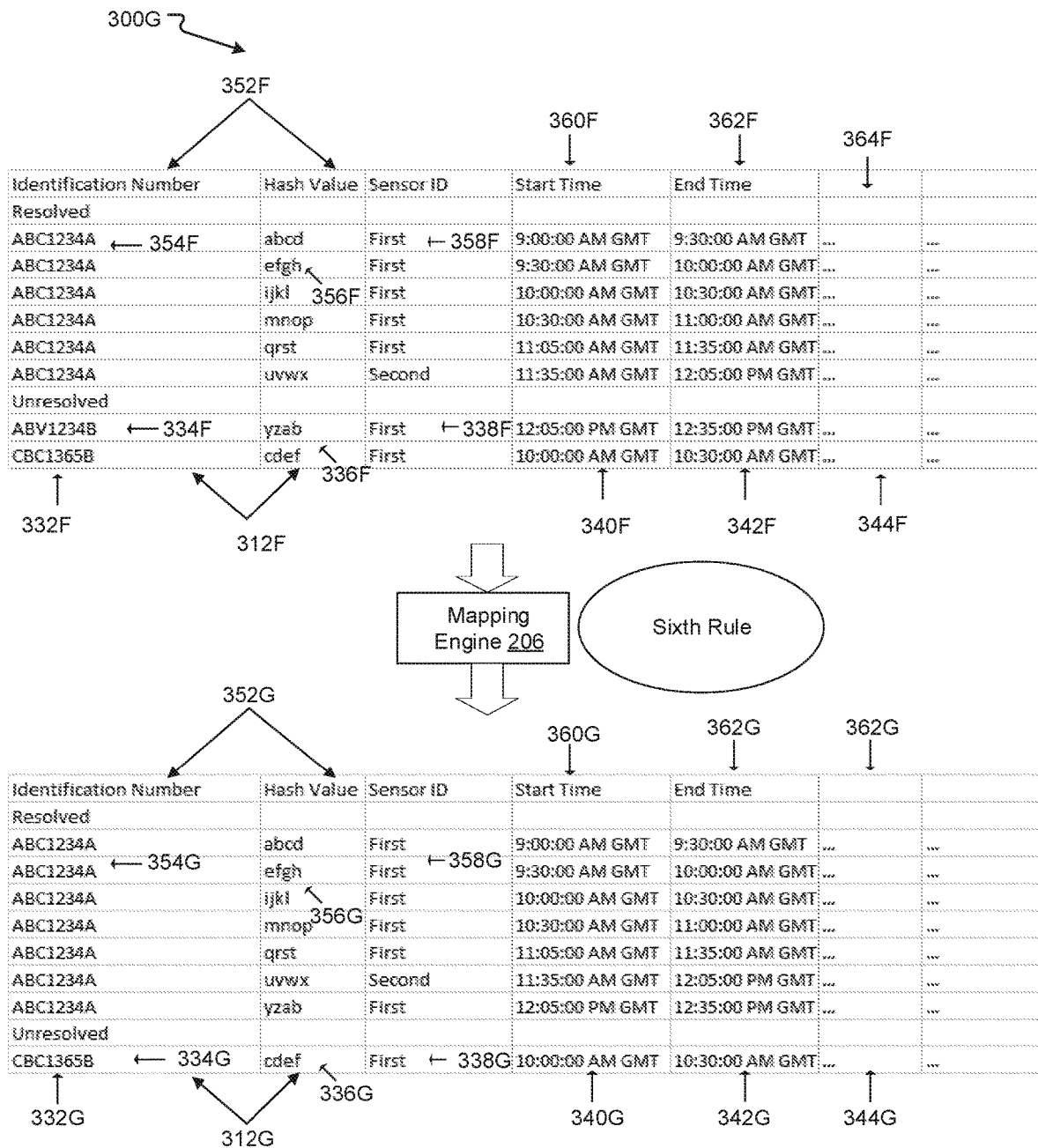

As shown in example 300G of FIG. 3G, the mapping engine 206 may apply a sixth rule to resolve remaining unresolved entries 332F satisfying any of the first through fifth rules, with a relaxed time constraint. As an example of the relaxed time constraint, the start time 340F need not be within a range of the start time 308 and the end time 310 of the information 302. For example, the start time 340F may be outside the range of the start time 308 and the end time 310 by a first threshold time, such as five minutes. In the example 300G of FIG. 3G, the entry having the hash value 336F of "yzab" has a start time 340F of 12:05:00 PM GMT, which is outside the range of the start time 308 and the end time 310 of the information 302, by 5 minutes. Applying the sixth rule, with the relaxed time constraint, the mapping engine 206 may resolve the entry having the hash value 336F of "yzab." The mapping engine 206 may create an updated mapping of the sensor data 312G by appending the selected entry to the previously resolved entries 352F. The mapping engine 206 may output the appended selected entries with the previously resolved entries as updated resolved entries 352G, and remaining entries not selected to be mapped as unresolved entries 332G. The resolved entries 352G may each comprise identification numbers 354G of samples undergoing an operation of the workflow, hash values 356G, sensor IDs 358G of sensors used, start times 360G, end times 362G, and other sensor data 364G of an operation of the workflow. The one or more identification numbers 354G may be updated or corrected to match the identification number 304 of the information 302. In the example of FIG. 3G, the previous identification number 334F reading "ABV1234B" may be corrected to the identification number 354G reading "ABC1234A," when the mapping engine 206 outputs the resolved entries 352G. The one or more unresolved entries 332G may each comprise identification numbers 334G of samples undergoing an operation of the workflow, hash values 336G, sensor IDs 338G of sensors used, start times 340G, end times 342G, and other sensor data 344G of an operation of the workflow. The mapping engine 206 may perform a further validation on the resolved entries 352G to ensure that at any point in time, each identification number 354G corresponds or maps to only a single sensor ID 358G, and each sensor ID 358G only corresponds or maps to a single identification number 354G during a specified time period between a start time 360G and an end time 362G, such as between 12:05 PM GMT and 12:35 PM GMT. For example, at 12:15:00 PM GMT, or at a time period between 12:05 PM GMT and 12:35 PM GMT, the entry having a hash value 356G of "yzab" is the only entry that corresponds to sensor ID "first," and the entry having a sensor ID "first" is the only entry that corresponds to an identification number 354G. In the example of FIG. 3G, only a single sensor ID 358G, and only a single identification number 354G, is listed, at a time period between the start time 360G of 12:05 AM GMT and the end time 362G of 12:35 PM GMT. In some embodiments, each sensor ID 358G may be mapped to different identification numbers 354G in different, non-overlapping time periods such as time periods of 30 minutes long. As an example, a sensor ID 358G may be mapped to an identification number 354G in a time period between 12:05 AM GMT and 12:35 PM GMT, and mapped to a different identification number in another time period. In some embodiments, multiple distinct sensor IDs 358G and multiple distinct identification numbers 354G may exist at a given point in time. The mapping engine 206 may confirm that, at a given point in time or within a given time window, a sensor ID 358G is mapped in a one-to-one relationship with an identification number 354G. For example, the mapping engine 206 may confirm that, within a given time window, a sensor ID 358G is uniquely matched to a single identification number 354G, and an identification number 354G is uniquely matched to a single sensor ID 358G. In some embodiments, the mapping engine 206 may confirm that a sensor ID 358G is unique to an identification number 354G during a specified time range. Additionally, the mapping engine 206 may confirm that no overlap of time periods between different resolved entries occurs. In some examples, the mapping engine 206 may confirm that a start time 360G of an entry 352G is not before an end time 362G of a most recent previous entry. In the example 300G of FIG. 3G, the mapping engine validates the resolved entries 352G.

In some examples, the mapping engine 206 may further resolve the remaining unresolved entries 332G based on the other sensor data 344G, such as an operation or a suboperation. For example, the mapping engine 206 may resolve the remaining unresolved entries 332G if the operation or the suboperation listed in the other sensor data 344G matches the operation or the suboperation, listed in the other sensor data 364F, of one or more of the resolved entries 352F. Unresolved entries may be separated into different datasets.

Example Flowcharts of Process

Figure 4A:
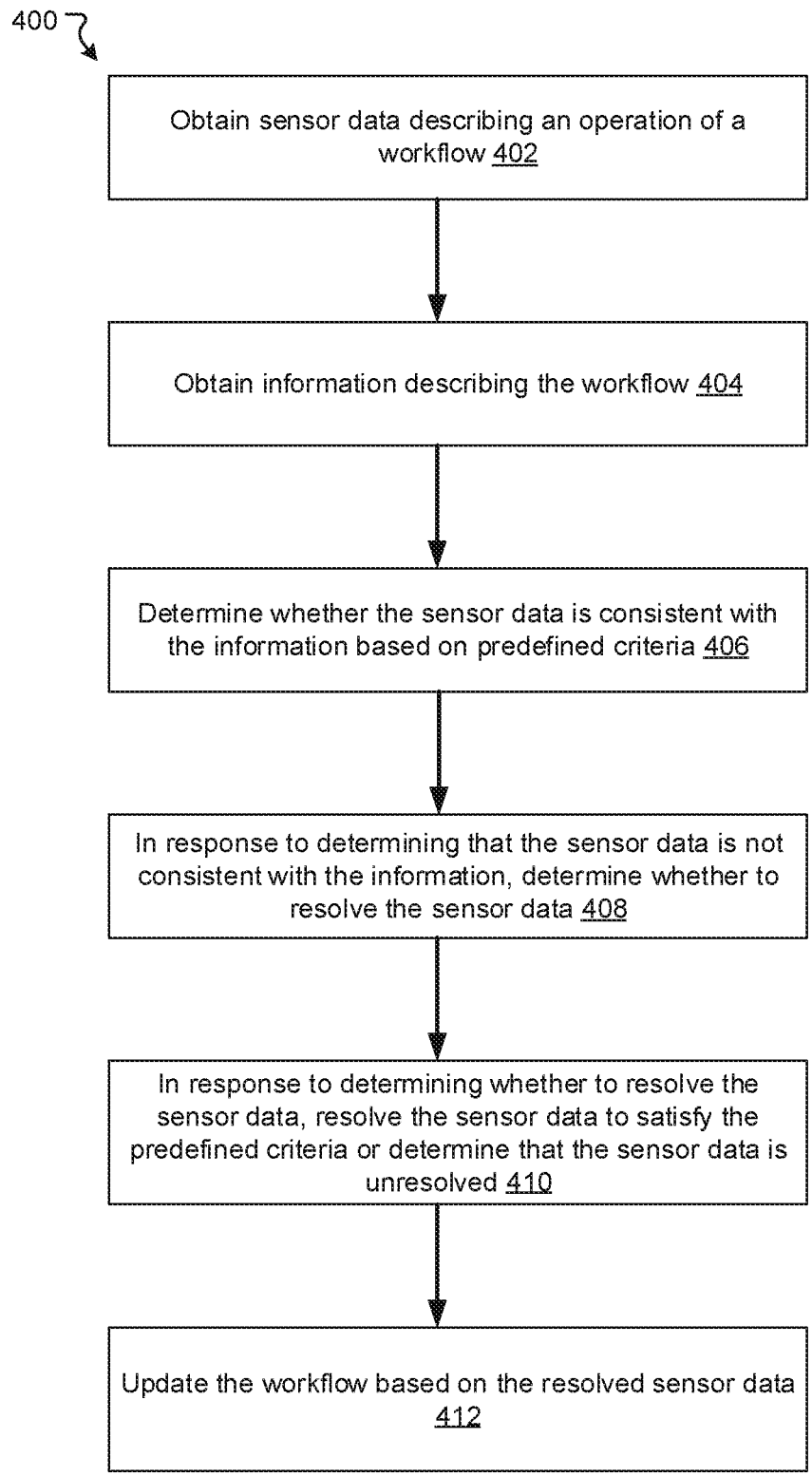
FIGS. 4A-4B depict flowcharts of example methods, in accordance with various embodiments.

FIG. 4A depicts a flowchart of an example method 400 for updating a workflow, in accordance with various embodiments. The operations of method 400 presented below are intended to be illustrative and, as such, should not be viewed as limiting. In some implementations, method 400 may be accomplished with one or more additional operations not described, and/or without one or more of the operations discussed. In some implementations, two or more of the operations may occur substantially simultaneously. The described operations may be accomplished using some or all of the system components described herein.

In an operation 402, method 400 may include obtaining sensor data describing an operation of a workflow. In an operation 404, method 400 may include obtaining information describing the workflow. In an operation 406, method 400 may include determining whether the sensor data is consistent with the information based on predefined criteria. In an operation 408, method 400 may include, in response to determining that the sensor data is not consistent with the information, determining whether to resolve the sensor data. In an operation 410, method 400 may include, in response to determining whether to resolve the sensor data, resolving the sensor data to satisfy the predefined criteria or determining that the sensor data is unresolved. In an operation 412, method 400 may include updating the workflow based on the resolved sensor data.

Figure 4B:
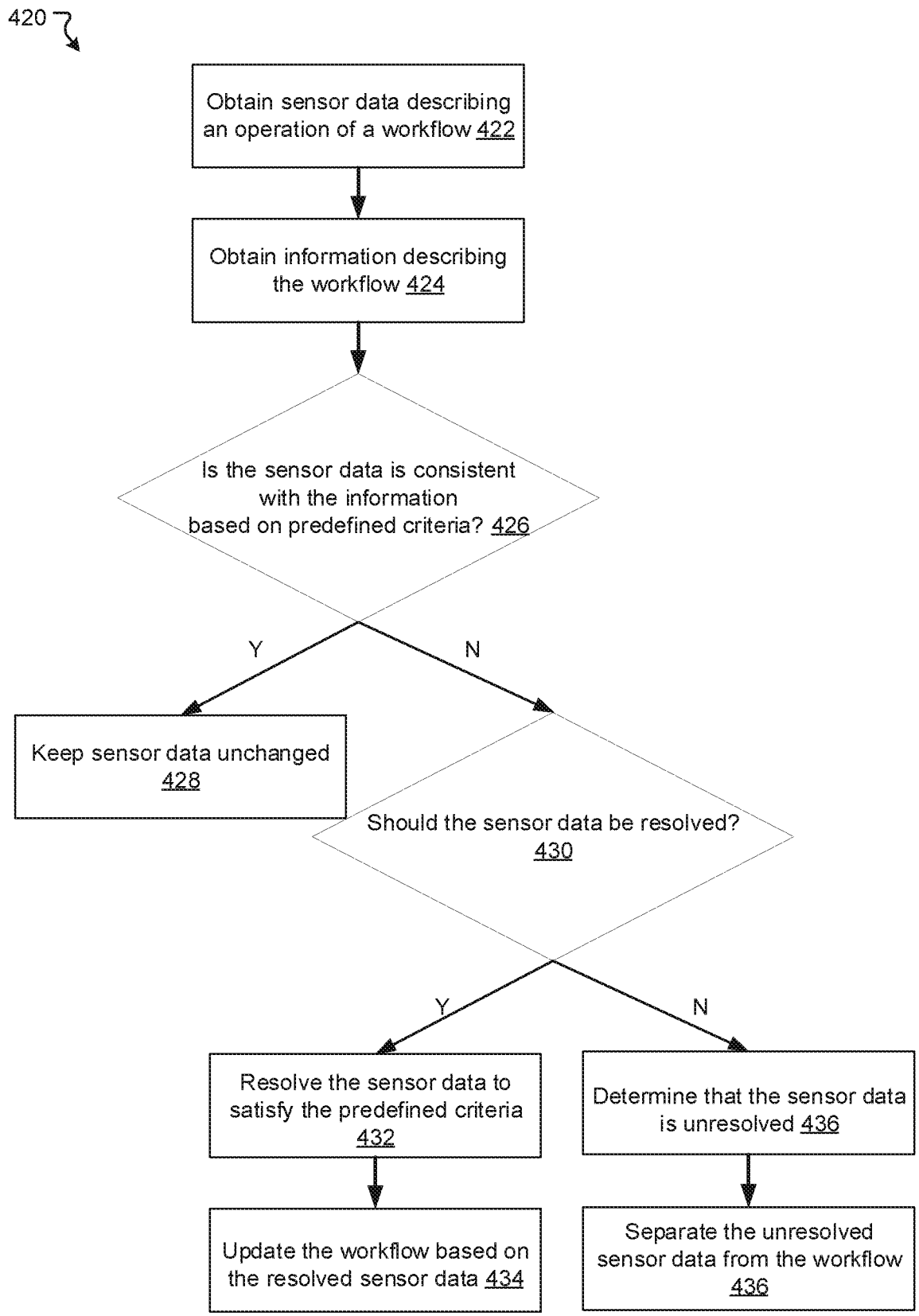

FIG. 4B depicts a flowchart of an example method 420 updating a workflow, in accordance with various embodiments. The operations of method 420 presented below are intended to be illustrative and, as such, should not be viewed as limiting. In some implementations, method 420 may be accomplished with one or more additional operations not described, and/or without one or more of the operations discussed. In some implementations, two or more of the operations may occur substantially simultaneously. The described operations may be accomplished using some or all of the system components described herein.

In an operation 422, method 420 may include obtaining sensor data describing an operation of a workflow. In an operation 424, method 420 may include obtaining information describing the workflow. In a decision 426, method 400 may include determining whether the sensor data is consistent with the information based on predefined criteria. In response to determining that the sensor data is consistent with the information, in an operation 428, method 420 may include keeping the sensor data unchanged. In response to determining that the sensor data is not consistent with the information, in a decision 430, method 420 may include determining whether the sensor data should be resolved. In response to determining that the sensor data should be resolved, in an operation 432, method 420 may include resolving the sensor data to satisfy the predefined criteria. In an operation 434, method 420 may include updating the workflow based on the resolved sensor data. In response to determining that the sensor data should not be resolved, in an operation 436, method 420 may include determining that the sensor data is unresolved. In an operation 438, method 420 may include separating the unresolved sensor data from the workflow.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
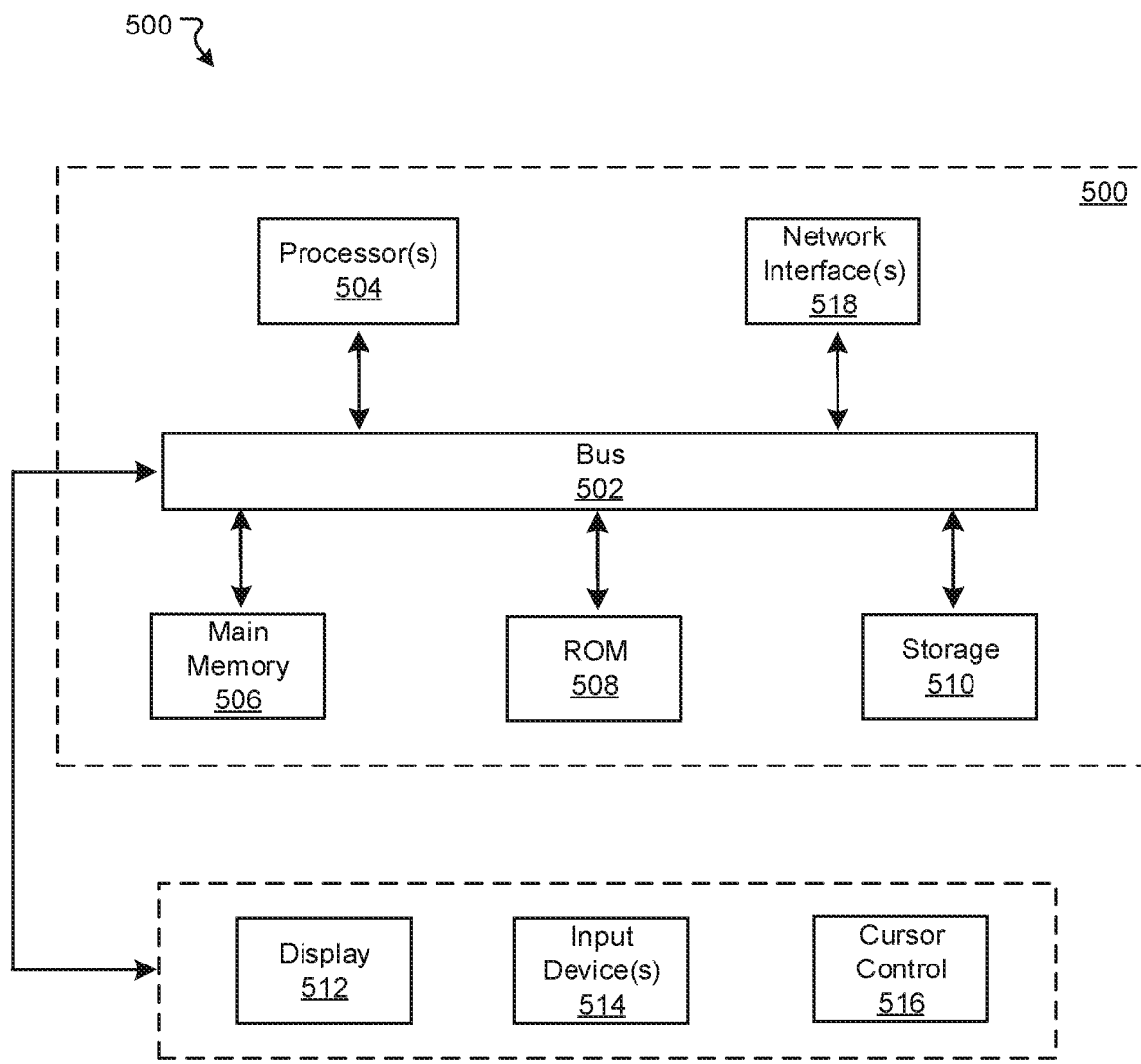
FIG. 5 depicts a block diagram of an example computer system in which any of the embodiments described herein may be implemented.

FIG. 5 depicts a block diagram of an example computer system 500 in which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media may also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer may load the instructions into its dynamic memory and send the instructions over a telephone line using a modem. A modem local to computer system 500 may receive the data on the telephone line and use an infra-red transmitter to convert the data to an infra-red signal. An infra-red detector may receive the data carried in the infra-red signal and appropriate circuitry may place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 may send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines may provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.
Language Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment may be combined with one or more features of any other embodiment.

Other implementations, uses and advantages of the invention will be apparent to those skilled in the art from consideration of the specification and practice of the invention disclosed herein. The specification should be considered to describe examples only, and the scope of the invention is accordingly intended to be limited only by the following claims.

What is claimed is:

1. A system comprising:
one or more processors; and
a memory storing instructions that, when executed by the one or more processors, cause the system to perform:
obtaining sensor data describing an operation of the workflow, wherein the sensor data comprises identification numbers of samples, respective sensor identifiers indicating respective sensors, of a plurality of sensors, that have operated on the samples, respective start times, and respective end times at which the sensors have operated on the samples;
obtaining information describing the workflow, wherein the information is manually logged;
determining whether the sensor data is consistent with the information based on predefined criteria;
in response to determining that the sensor data is inconsistent with the information, determining whether to resolve the sensor data;
in response to determining to resolve the sensor data, resolving the sensor data to satisfy the predefined criteria, wherein the resolving comprises verifying that at a particular point in time, a particular identification number of a sample is uniquely matched to a particular sensor identifier of a sensor, selected from the plurality of sensors; and
updating the workflow based on the resolved sensor data.

2. The system of claim 1, wherein, the instructions further cause the system to perform:
determining whether the sensor data comprises duplicate entries based on a comparison between hash values of entries of the sensor data; and
in response to determining the sensor data comprises one or more duplicate entries, removing the one or more duplicate entries.

3. The system of claim 1, wherein:
each entry of the sensor data comprises a sensor ID of the operation and a start time of the operation;
the information comprises a sensor ID of the workflow, a start time of the workflow and an end time of the workflow;
the predefined criteria comprises a first criterion that the start time of each entry of the sensor data is between the start time of the information and the end time of the information, and that the sensor ID of each entry of the sensor data matches the sensor ID of the information; and
the determining whether the sensor data is consistent with the information comprises determining, for each entry of the sensor data, whether the predefined criteria is satisfied.

4. The system of claim 3, wherein:
each entry of the sensor data further comprises an identification number indicating a sample undergoing the workflow;
the information further comprises an identification number indicating a sample undergoing the workflow; and
the predefined criteria further comprises a second criterion that the identification number of each entry of the sensor data matches the identification number of the information.

5. The system of claim 4, wherein:
the identification number of each entry of the sensor data comprises an alphanumeric including a first alphabetic portion preceding a numeric portion and a second alphabetic portion following the numeric portion;
the identification number of the information comprises an alphanumeric including a first alphabetic portion preceding a numeric portion and a second alphabetic portion following the numeric portion; and
the determining whether the sensor data is consistent with the information comprises determining, for each entry of the sensor data, whether the first alphabetic portion, the numeric portion, and the second alphabetic portion matches the first alphabetic portion, the numeric portion, and the second alphabetic portion of the identification number, respectively.

6. The system of claim 1, wherein:
each entry of the sensor data further comprises an identification number indicating a sample undergoing the workflow, the identification number of each entry of the sensor data comprising an alphanumeric including a first alphabetic portion preceding a numeric portion and a second alphabetic portion following the numeric portion;
the information further comprises an identification number indicating a sample undergoing the workflow, the identification number of the information comprising an alphanumeric including a first alphabetic portion preceding a numeric portion and a second alphabetic portion following the numeric portion; and the determining whether to resolve the sensor data comprises determining, for each entry of the sensor data, whether the first alphabetic portion and the numeric portion matches the first alphabetic portion and the numeric portion of the identification number, respectively.

7. The system of claim 1, wherein:
each entry of the sensor data further comprises an identification number indicating a sample undergoing the workflow, the identification number of each entry of the sensor data comprising an alphanumeric including a first alphabetic portion preceding a numeric portion and a second alphabetic portion following the numeric portion;
the information further comprises an identification number indicating a sample undergoing the workflow, the identification number of the information comprising an alphanumeric including a first alphabetic portion preceding a numeric portion and a second alphabetic portion following the numeric portion; and
the determining whether to resolve the sensor data comprises determining, for each entry of the sensor data, whether the numeric portion and the second alphabetic portion matches the numeric portion and the second alphabetic portion of the identification number, respectively.

8. The system of claim 1, wherein:
each entry of the sensor data further comprises an identification number indicating a sample undergoing the workflow, the identification number of each entry of the sensor data comprising an alphanumeric including a first alphabetic portion preceding a numeric portion and a second alphabetic portion following the numeric portion;
the information further comprises an identification number indicating a sample undergoing the workflow, the identification number of the information comprising an alphanumeric including a first alphabetic portion preceding a numeric portion and a second alphabetic portion following the numeric portion; and
the determining whether to resolve the sensor data comprises determining, for each entry of the sensor data, whether the numeric portion matches the numeric portion of the identification number.

9. The system of claim 8, wherein:
the resolving the sensor data to satisfy the predefined criteria comprises, for each entry of the sensor data, in response to determining the numeric portion matches the numeric portion of the identification number, matching the first alphabetic portion and the second alphabetic portion to the first alphabetic portion and the second alphabetic portion of the information, respectively.

10. The system of claim 1, wherein the resolving comprises stages, a first stage comprising labelling any entries of the sensor data that have sensor identifiers that match sensor identifiers of the information, and having start times within ranges of the start time and the end time of the information, and a second stage comprising selecting an earliest entry, from the labelled entries, in which a numeric portion of the identification number of the sensor data matches a numeric portion of the identification number of the information, and resolving the selected entry.

11. The system of claim 10, where the stages further comprise:
a third stage comprising resolving any remaining entries in which an identification number of the sensor data matches an identification number of the information, a start time of the sensor data is within a range of a start time and an end time of the information, and a sensor identifier of the sensor data matches a sensor identifier of the information, and a fourth stage comprising resolving any remaining entries in which a first alphabetic portion and a numeric portion of the identification number of the sensor data matches a first alphabetic portion and a numeric portion of the identification number of the information, a start time of the sensor data is within a range of the start time and the end time of the information, and a sensor identifier of the sensor data matches the sensor identifier of the information.

12. A method implemented by a computing system including one or more processors and storage media storing machine-readable instructions, wherein the method is performed using the one or more processors, the method comprising:
obtaining sensor data describing an operation of the workflow, wherein the sensor data comprises identification numbers of samples, respective sensor identifiers indicating respective sensors, of a plurality of sensors, that have operated on the samples, respective start times, and respective end times at which the sensors have operated on the samples;
obtaining information describing the workflow, wherein the information is manually logged;
determining whether the sensor data is consistent with the information based on predefined criteria;
in response to determining that the sensor data is inconsistent with the information, determining whether to resolve the sensor data;
in response to determining to resolve the sensor data, resolving the sensor data to satisfy the predefined criteria, wherein the resolving comprises verifying that at a particular point in time, a particular identification number of a sample is uniquely matched to a particular sensor identifier of a sensor, selected from the plurality of sensors; and
updating the workflow based on the resolved sensor data.

13. The method of claim 12, further comprising:
determining whether the sensor data comprises duplicate entries based on a comparison between hash values of entries of the sensor data; and
in response to determining the sensor data comprises one or more duplicate entries, removing the one or more duplicate entries.

14. The method of claim 12, wherein:
each entry of the sensor data comprises a sensor ID of the operation and a start time of the operation;
the information comprises a sensor ID of the workflow, a start time of the workflow and an end time of the workflow;
the predefined criteria comprises a first criterion that the start time of each entry of the sensor data is between the start time of the information and the end time of the information, and that the sensor ID of each entry of the sensor data matches the sensor ID of the information; and
the determining whether the sensor data is consistent with the information comprises determining, for each entry of the sensor data, whether the predefined criteria is satisfied.

15. The method of claim 14, wherein:
each entry of the sensor data further comprises an identification number indicating a sample undergoing the workflow;

the information further comprises an identification number indicating a sample undergoing the workflow; and the predefined criteria further comprises a second criterion that the identification number of each entry of the sensor data matches the identification number of the information.

16. The method of claim 15, wherein:

the identification number of each entry of the sensor data comprises an alphanumeric including a first alphabetic portion preceding a numeric portion and a second alphabetic portion following the numeric portion;

the identification number of the information comprises an alphanumeric including a first alphabetic portion preceding a numeric portion and a second alphabetic portion following the numeric portion; and the determining whether the sensor data is consistent with the information comprises determining, for each entry of the sensor data, whether the first alphabetic portion, the numeric portion, and the second alphabetic portion matches the first alphabetic portion, the numeric portion, and the second alphabetic portion of the identification number, respectively.

17. The method of claim 12, wherein:

each entry of the sensor data further comprises an identification number indicating a sample undergoing the workflow, the identification number of each entry of the sensor data comprising an alphanumeric including a first alphabetic portion preceding a numeric portion and a second alphabetic portion following the numeric portion;

the information further comprises an identification number indicating a sample undergoing the workflow, the identification number of the information comprising an alphanumeric including a first alphabetic portion preceding a numeric portion and a second alphabetic portion following the numeric portion; and the determining whether to resolve the sensor data comprises determining, for each entry of the sensor data, whether the first alphabetic portion and the numeric portion matches the first alphabetic portion and the numeric portion of the identification number, respectively.

18. The method of claim 12, wherein:

each entry of the sensor data further comprises an identification number indicating a sample undergoing the workflow, the identification number of each entry of the sensor data comprising an alphanumeric including a first alphabetic portion preceding a numeric portion and a second alphabetic portion following the numeric portion;

the information further comprises an identification number indicating a sample undergoing the workflow, the identification number of the information comprising an alphanumeric including a first alphabetic portion preceding a numeric portion and a second alphabetic portion following the numeric portion; and the determining whether to resolve the sensor data comprises determining, for each entry of the sensor data, whether the numeric portion and the second alphabetic portion matches the numeric portion and the second alphabetic portion of the identification number, respectively.

19. The method of claim 12, wherein:

each entry of the sensor data further comprises an identification number indicating a sample undergoing the workflow, the identification number of each entry of the sensor data comprising an alphanumeric including a first alphabetic portion preceding a numeric portion and a second alphabetic portion following the numeric portion;

the information further comprises an identification number indicating a sample undergoing the workflow, the identification number of the information comprising an alphanumeric including a first alphabetic portion preceding a numeric portion and a second alphabetic portion following the numeric portion; and the determining whether to resolve the sensor data comprises determining, for each entry of the sensor data, whether the numeric portion matches the numeric portion of the identification number.

20. The method of claim 19, wherein:

the resolving the sensor data to satisfy the predefined criteria comprises, for each entry of the sensor data, in response to determining the numeric portion matches the numeric portion of the identification number, matching the first alphabetic portion and the second alphabetic portion to the first alphabetic portion and the second alphabetic portion of the information, respectively.

* * * * *